US008616564B2

(12) United States Patent
Takehara et al.

(10) Patent No.: US 8,616,564 B2
(45) Date of Patent: Dec. 31, 2013

(54) CARGO CONTAINER HANDLING CART AND SYSTEM USING SAME

(75) Inventors: Toru Takehara, Foster City, CA (US); Philip Tam, Oakland, CA (US); Tatsushi Takahara, San Mateo, CA (US)

(73) Assignee: Paceco Corp., Hayward, CA (US)

( * ) Notice: Subject to any disclaimer, the term of this patent is extended or adjusted under 35 U.S.C. 154(b) by 399 days.

(21) Appl. No.: 12/831,207

(22) Filed: Jul. 6, 2010

(65) Prior Publication Data
US 2011/0133419 A1 Jun. 9, 2011

Related U.S. Application Data

(60) Provisional application No. 61/267,347, filed on Dec. 7, 2009, provisional application No. 61/299,969, filed on Jan. 30, 2010.

(51) Int. Cl.
*B62B 3/04* (2006.01)
(52) U.S. Cl.
USPC ..................................................... 280/79.11
(58) Field of Classification Search
CPC ..... B62B 5/0086; B62B 5/0093; B65D 90/18
USPC .......... 280/79.11, 79.3, 400, 47.34; 180/14.1, 180/14.2; 105/3, 4.1, 4.2
See application file for complete search history.

(56) References Cited

U.S. PATENT DOCUMENTS

| | | | | |
|---|---|---|---|---|
| 1,654,814 A | * | 1/1928 | Jonkhoff | 280/408 |
| 2,039,489 A | * | 5/1936 | Messick | 105/215.2 |
| 2,966,236 A | * | 12/1960 | Jones | 188/41 |
| 3,002,470 A | * | 10/1961 | Flowers | 105/250 |
| 3,144,141 A | * | 8/1964 | Tantlinger et al. | 220/23.83 |
| 3,154,316 A | * | 10/1964 | Gohmann | 280/103 |
| 3,208,768 A | * | 9/1965 | Hulbert | 280/408 |
| 3,288,481 A | * | 11/1966 | Meyers | 280/47.27 |
| 3,317,219 A | * | 5/1967 | Hindin et al. | 410/53 |
| 3,404,444 A | * | 10/1968 | Isbrandtsen | 29/897 |
| 3,497,026 A | * | 2/1970 | Calvert | 180/165 |
| 3,514,001 A | * | 5/1970 | Brush et al. | 414/607 |
| 4,416,571 A | * | 11/1983 | Krause | 410/53 |

(Continued)

FOREIGN PATENT DOCUMENTS

WO PCT/US2010/059330 6/2011

*Primary Examiner* — John R Olszewski
*Assistant Examiner* — Brodie Follman
(74) *Attorney, Agent, or Firm* — Brian Beverly; Beeson Skinner Beverly, LLP

(57) ABSTRACT

A cargo container handling cart and system comprises a plurality of cargo container handling carts 10, each cart comprising a frame 12 supported on wheels 16, the frame having two support surfaces 26 and at least one centrally disposed container guide 20, each support surface having two cart pins 32, and a cart end edge 28, the support surface 26 bounded by the container guide 20 and the cart end edge 28 for supporting the end of a cargo container, wherein the support surface 26 has a width substantially equivalent to a standard cargo container, the container guide 20 abuts a container end resting on one of the support surfaces 26, and the cart pins 32 extend upwardly from the support surface 26 between the container guide 20 and the cart end edge 28 for engaging with the corner casting holes of the corner fittings of the container end for holding the container end on the support surface 26 against the container guide 20.

45 Claims, 12 Drawing Sheets

(56) References Cited

U.S. PATENT DOCUMENTS

| | | | | |
|---|---|---|---|---|
| 4,597,337 A * | 7/1986 | Willetts | | 105/4.1 |
| 4,665,834 A * | 5/1987 | van Iperen | | 105/4.1 |
| 4,669,391 A * | 6/1987 | Wicks et al. | | 105/4.3 |
| 4,699,065 A * | 10/1987 | Kibble | | 105/199.5 |
| 4,819,566 A * | 4/1989 | Smith et al. | | 105/168 |
| 4,869,177 A * | 9/1989 | Mangone | | 105/42 |
| 4,936,733 A * | 6/1990 | Girerd | | 414/458 |
| 4,955,144 A * | 9/1990 | Lienard et al. | | 105/4.2 |
| 4,998,483 A * | 3/1991 | Prins | | 105/3 |
| 5,020,445 A * | 6/1991 | Adams, Jr. | | 105/4.1 |
| 5,429,472 A * | 7/1995 | Dahl | | 414/787 |
| 5,431,110 A * | 7/1995 | Adams, Jr. | | 105/4.1 |
| 5,537,931 A * | 7/1996 | Donkin | | 105/159 |
| 5,796,224 A * | 8/1998 | Hayashi et al. | | 318/139 |
| 6,021,718 A * | 2/2000 | Kroll et al. | | 105/3 |
| 6,050,197 A * | 4/2000 | Wicks | | 105/4.2 |
| 6,447,236 B1 * | 9/2002 | Grams et al. | | 414/401 |
| 6,474,242 B1 * | 11/2002 | Baier | | 105/4.1 |
| 6,634,658 B2 * | 10/2003 | Larouche | | 280/47.2 |
| 6,860,210 B2 * | 3/2005 | Baier | | 105/167 |
| 6,974,140 B2 * | 12/2005 | Neuman | | 280/79.11 |
| 6,979,005 B1 * | 12/2005 | McLerran | | 280/33.998 |
| 7,275,752 B2 * | 10/2007 | Northcutt | | 280/79.11 |
| 7,320,405 B2 * | 1/2008 | Stahl | | 206/509 |
| 7,384,051 B1 * | 6/2008 | Haire | | 280/47.34 |
| 7,673,889 B2 * | 3/2010 | Wells et al. | | 280/79.11 |
| 7,857,572 B1 * | 12/2010 | Thompson | | 414/458 |
| 8,215,240 B2 * | 7/2012 | Graaff et al. | | 105/215.2 |
| 8,291,592 B2 * | 10/2012 | Saxton et al. | | 29/897.1 |
| 2002/0073878 A1 * | 6/2002 | Teacherson | | 105/3 |
| 2007/0085288 A1 * | 4/2007 | Wells et al. | | 280/79.11 |
| 2008/0054580 A1 * | 3/2008 | Glaser | | 280/35 |
| 2010/0242787 A1 * | 9/2010 | Wicks et al. | | 105/4.4 |
| 2011/0133419 A1 * | 6/2011 | Takehara et al. | | 280/79.3 |
| 2011/0217150 A1 * | 9/2011 | Takehara et al. | | 414/392 |
| 2011/0297905 A1 * | 12/2011 | Arensdorf et al. | | 254/8 R |
| 2012/0267869 A1 * | 10/2012 | Hassell | | 280/79.11 |

* cited by examiner

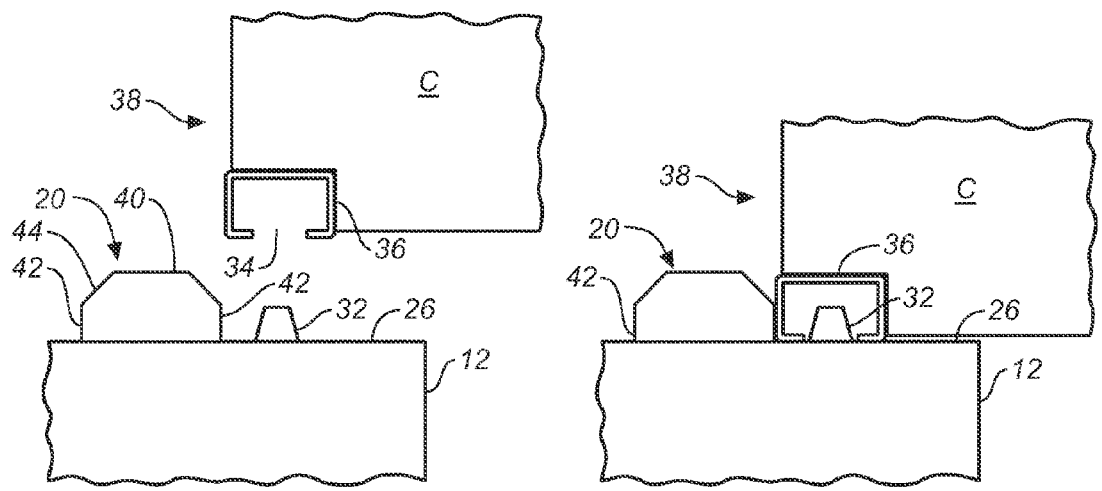
FIG. 5A    FIG. 5B
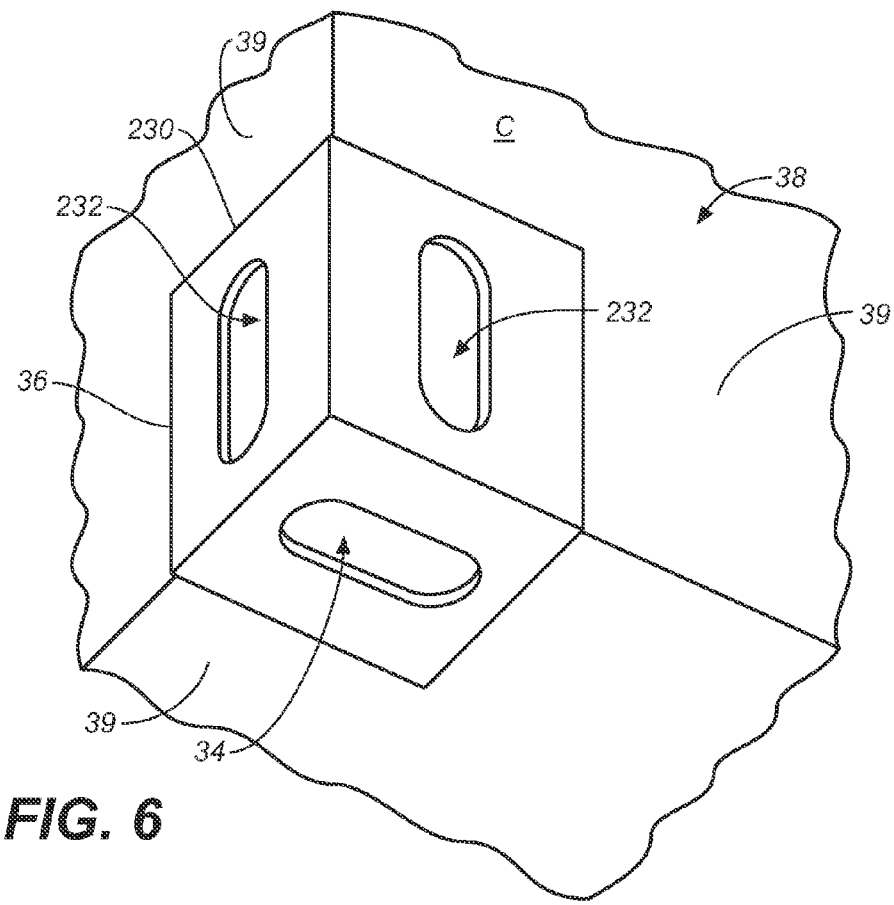
FIG. 6

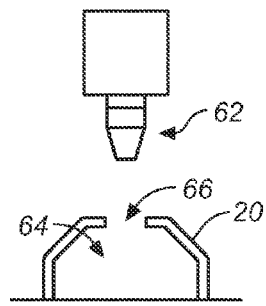 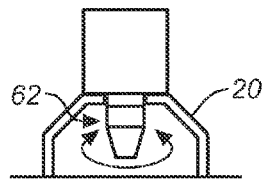 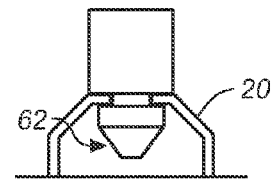
*FIG. 7A*  *FIG. 7B*  *FIG. 7C*
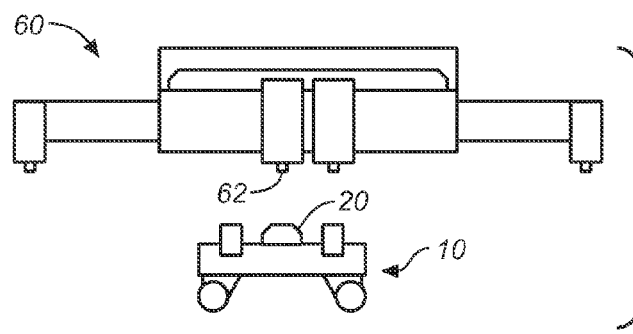
*FIG. 7D*
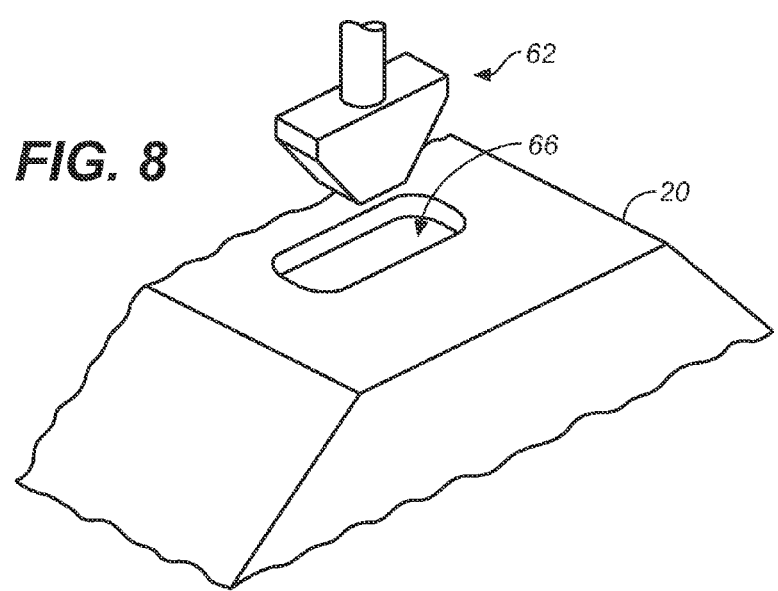
*FIG. 8*

CARGO CONTAINER HANDLING CART AND SYSTEM USING SAME

CROSS-REFERENCE TO RELATED APPLICATIONS

This application claims the benefit of U.S. Patent Application Ser. No. 61/267,347, filed Dec. 7, 2009, and U.S. Patent Application Ser. No. 61/299,969, filed Jan. 30, 2010, both of which are hereby incorporated by reference.

BACKGROUND

1. Field of the Invention

This invention is related to systems for transporting cargo containers within container terminals and, more particularly, to a cargo container handling cart capable of supporting the ends of two or more adjacent cargo containers, a plurality of which carts may be used to form and transport a "train" of cargo containers within a container terminal or between separate terminals.

2. Prior Art

Operations within container terminals require dedicated equipment and methods for transporting containers between various cargo handling cranes and other cargo handling equipment. For example, terminal operators commonly use trucks with chassis to transport containers from dockside cranes to yard cranes or to transport containers in a stacking area from one position to another. Each chassis is typically 40-48 feet long and designed to carry either one container 40-48 feet long, or two 20 foot containers. Some terminals use trucks with multi-chassis in an effort to improve efficiency. "Multi-chassis" refers to multiple individual chassis strung together all towed by a single truck. More automated terminals may use automated guided vehicles, rail cars and straddle carriers.

A singular advantage of using railcars and trucks with multi-chassis to transport multiple containers is that the truck or railcar can be controlled by a single operator. On the other hand, trucks and railcars have poor maneuverability and inadequate flexibility. This is in part due to the fact that conventional standardized railcars and truck chassis are designed to accommodate the largest possible container size, even though the largest containers may not be the container size most commonly in use. Since container sizes generally vary, inefficient use of these conventional means of container transport results. For example, FIG. 1 shows three chassis of the same size carrying three containers of different lengths leaving unused capacity on the second and third chassis.

SUMMARY OF THE INVENTION

A cargo container handling system using cargo container handling carts overcomes the inefficiencies and disadvantages inherent in prior art terminal cargo container transportation systems. A cargo container handling system according to the invention comprises a plurality of self-propelled handling carts each of which acts as a mobile platform capable of carrying one of the two ends of one or more containers on each end of the cart. Thus, rather than requiring a single, large conventional carrier such as railcar or truck chassis to support and carry one container, substantially shorter carts according to the invention can be used to support one or more containers by supporting only the ends of the containers rather than the entire length of each container. At least two carts 10 are used to support a single container; one to support the rear end of a container C, and another cart to support the front end, as shown in FIG. 2.

The cargo container handling system allows formation of a series of containers, generally referred to as a "container train." See FIG. 3. Each cart can support the front end of one container, and the back end of another container, thus linking adjacent pairs of containers and effectively creating a container train. There is no limit to the train length as long as carts are available. The physical length of a container train formed using container handling carts is shorter than a conventional train because the container train is determined by the combined lengths of the containers in the train rather than the combined lengths of the rail cars or truck chassis used to form a conventional train. The reduced weight of each cart causes less wear and tear on the terminal facility than a conventional train. The smaller size and weight of the container handling cart also makes it more maneuverable, more flexible, and easier to handle than rail cars and truck chassis. Moreover, empty carts can move freely, occupy smaller spaces due to their smaller footprints, and can easily be shifted from one location to another by any cart handling machinery.

BRIEF DESCRIPTION OF THE ILLUSTRATIONS

FIG. 5A is an elevational view of one end of the cargo container handling cart shown in FIGS. 4A-4C showing the container guide and a cart pin on the top surface of the cart and a close-up partial sectional view of the corner casting hole of the corner fitting of a cargo container.

FIG. 5B is a view similar to FIG. 5A showing the corner fitting supported on the cart with the cart pin received in the corner casting hole.

FIG. 6 is a lower perspective view of the corner fitting of a cargo container, the corner fitting having downward and laterally facing corner casting holes.

FIG. 7A is a sectional view of the container guide of a cargo container handling cart and a twistlock of a crane spreader.

FIG. 7B is a sectional view similar to FIG. 7A showing the twistlock received in the container guide.

FIG. 7C is a sectional view similar to FIG. 7B showing the twistlock having been rotated in the container guide.

FIG. 7D is an elevational view showing a crane spreader above a cargo container handling cart.

FIG. 8 is an upper perspective view of a twistlock poised over the top opening of a container guide on a container handling cart.

Figure 18A:
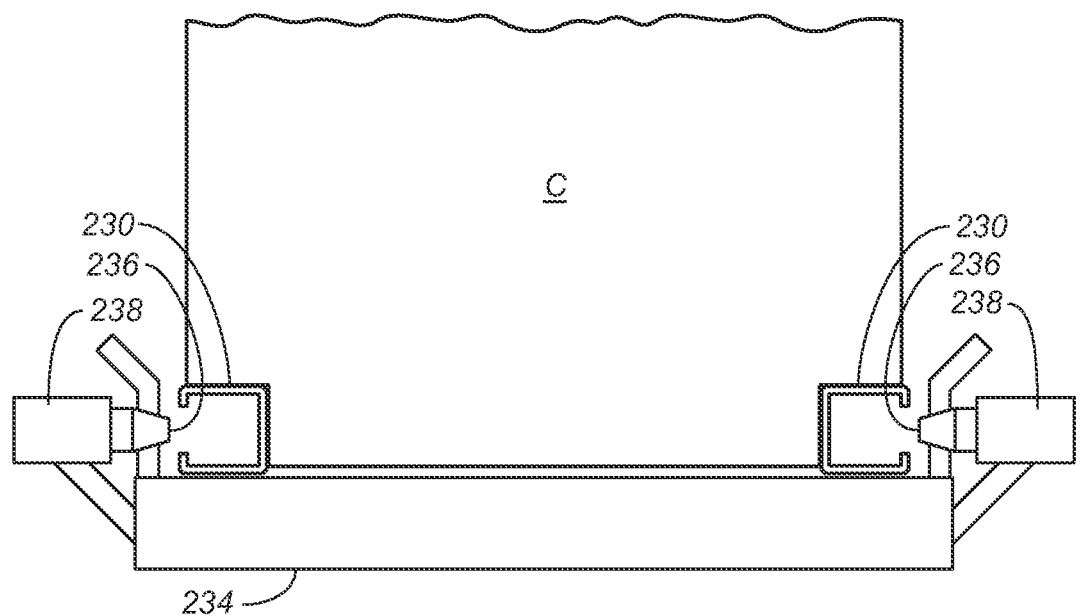
Figure 18B:
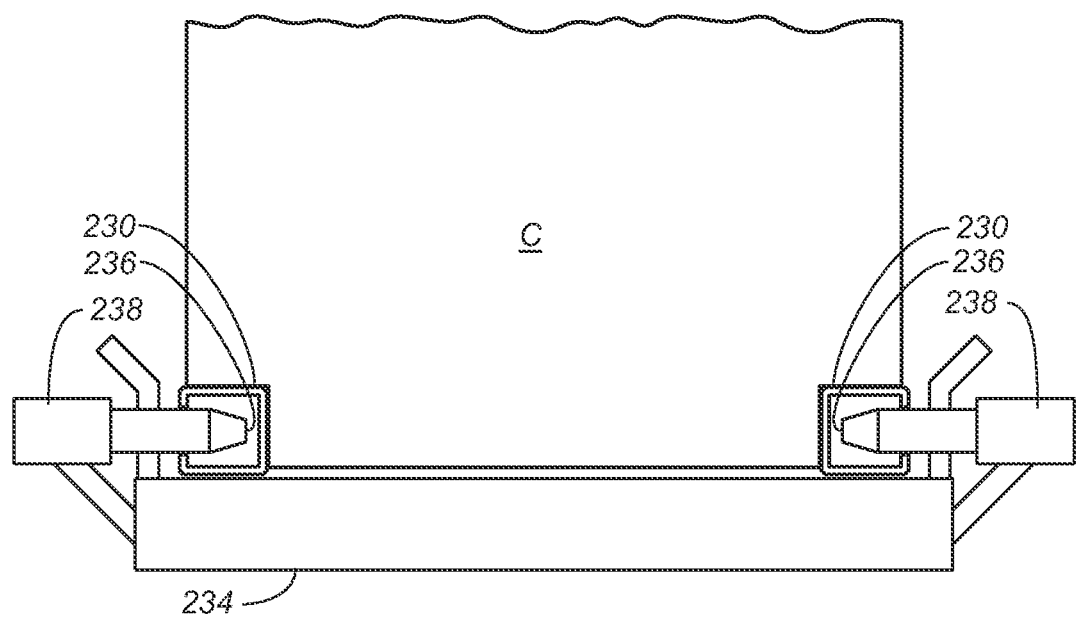

FIGS. 18A and 18B are elevational end views of a container resting on a container handling cart, the container having corner fittings having side corner casting holes, and laterally extending cart pins shown in a retracted state in which the cart pins are free of the corner fittings (FIG. 18A) and in extended state in which the cart pins are inserted into the corner casting holes of the corner fittings (FIG. 18B).

Figure 19A:
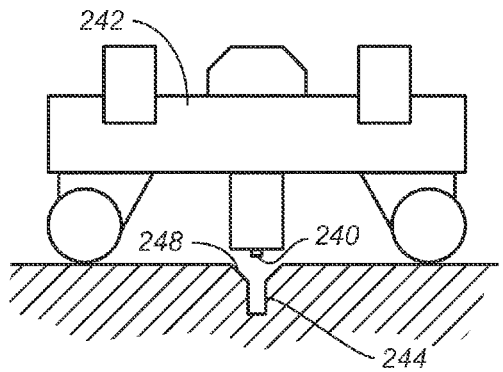
Figure 19B:
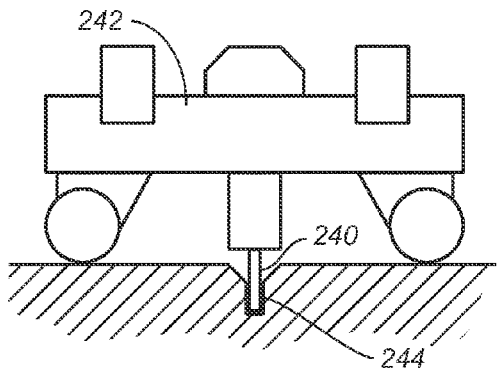

FIGS. 19A and 19B are elevational views of a cargo container handling cart having a positioning pin shown in a retracted state in FIG. 19A and in an extended state in FIG. 19B in which the pin is inserted into a positioning hole in the ground.

Figure 19C:
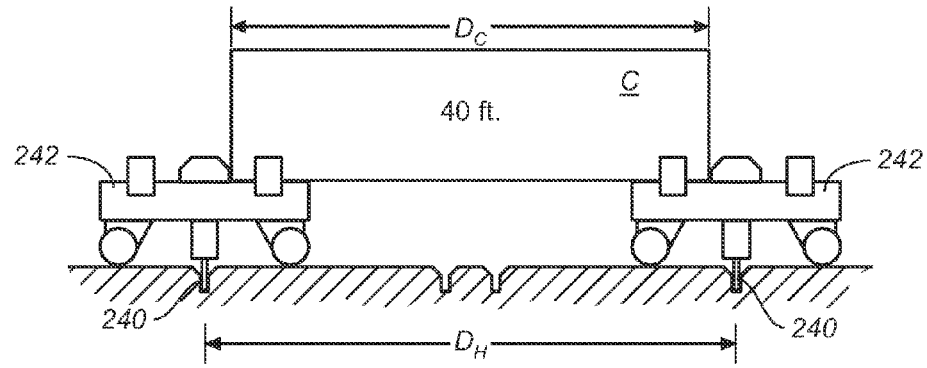

FIG. 19C is a graphical representation of the distance between two cargo container handling carts as related to the distance between the two ends of a container.

Figure 3:
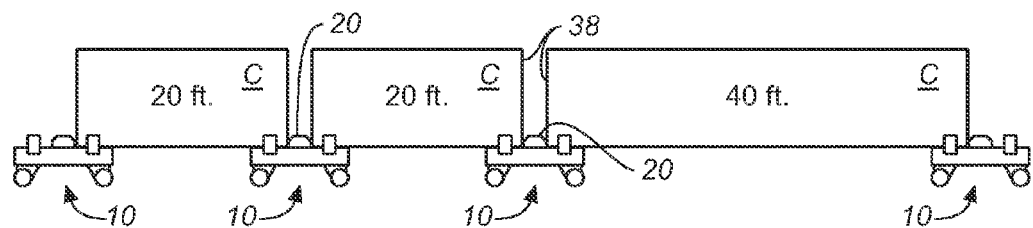
FIG. 3 is an elevational view of a container train formed by using several container handling carts of the type shown in FIG. 2.
Figure 19D:

FIG. 19D is an elevational view of a container train similar to FIG. 3 but showing carts equipped with a position fixing mechanism for a position tracking system.

DETAILED DESCRIPTION OF THE ILLUSTRATED EMBODIMENTS

Figure 4:
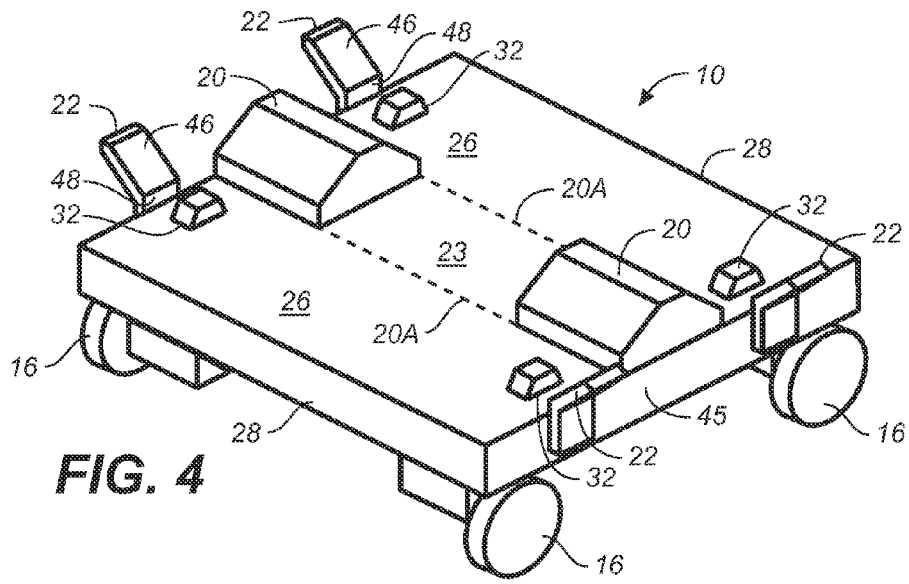
FIG. 4 is an upper perspective view of a container handling cart according to the invention.
Figure 4B:
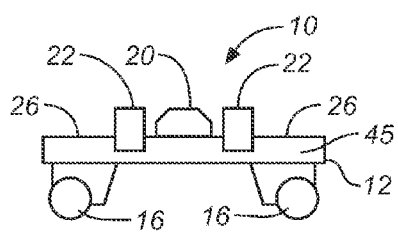
FIG. 4B is a side elevational view of the cargo container handling cart shown in FIG. 4.
Figure 4A:
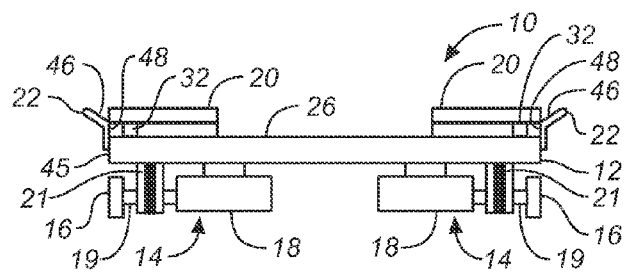
FIG. 4A is an end elevational view of the cargo container handling cart shown in FIG. 4.
Figure 4C:
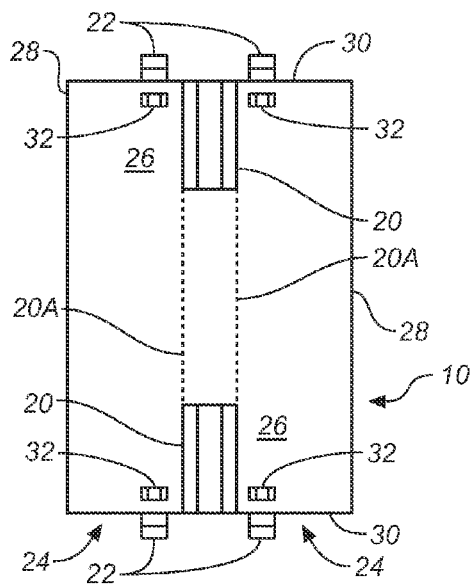
FIG. 4C is a plan view of the cargo container handling cart shown in FIG. 4.
Figure 4D:
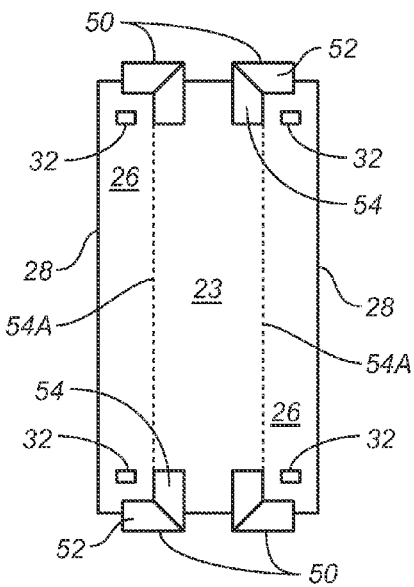
FIG. 4D is a plan view of another embodiment of a cargo container handling cart.

A cargo container handling cart for a segmented cargo container handling system is depicted generally at 10 in FIGS. 4, 4A, 4B and 4C. Each cart comprises a structural frame 12, a cart drive system 14 including wheels 16, motor and braking systems 18 and 19, respectively, a power source (not shown), container guides 20, and lateral container guides 22. Container guides are structures strategically positioned on the container handling cart 10 for contacting the edges or the corner fittings of a descending container end to guide it into place as discussed below in detail. Container guides may be attached to the top surface 23, sides 30, or other structural components (see, e.g., FIG. 16) of the frame 12, and may include elongated transversely extending guides 20, lateral container guides 22, and corner guides 50 (FIG. 4D). The top surface 23 of frame 12 includes two end portions 24, the inner edges of which are marked by broken lines 20A in FIG. 4C, and between which are mounted one or more of the container guides 20. Each support surface 26 is bounded lengthwise on its outer end by the cart's end edge 28 and on its inner end by container guides 20 and by broken lines 20A as shown in FIGS. 4 and 4C, and widthwise between the side edges 30 of the cart. Each support surface 26 is arranged to support one end of a container rather than the full length of a container. Therefore, according to one aspect of the invention, the length of each cart 10 is substantially less than the length of a standard cargo container. In another aspect of the invention, the frame 12 of the cart 10 has a length substantially less than twenty feet. In one embodiment of the invention, the frame 12 has a length substantially less than twelve feet. In another embodiment, each support surface has a length less than six feet. For purposes of this application, length shall be understood to be that dimension parallel to the direction of the cart 10 as it is moved on its wheels 16. Each support surface 26 has a width substantially the same as the width of a standard cargo container, but it will be understood that the width is not to be limited to only that of a standard cargo container. In the illustrated embodiment, each support surface 26 is rectangular. However those of skill in the art will appreciate that any support surface that acts functionally to support the end of a container may be regarded as a support surface. Thus, alternative support surfaces may be realized in many different shapes, can consist of a single integral surface, or may be comprised of two or more surfaces which together support a container end. Moreover, support should be understood to mean supporting any part of the container end, e.g., the corner fittings, the outer or side edges of the container, or the undersurface of the container.

Referring now to FIGS. 5A, 5B and 6, a cart pin 32 is provided on each of the support surfaces 26 adjacent one of the container guides 20 and one of the sides 30 (see again FIG. 4C) of the cart. The cart pins 32 are of a standard size for mating engagement with the lower corner casting hole 34 in each of the corner fittings 36 on the end 38 of a standard cargo container C. Those of skill in the art will understand that the corner fittings 36 extend slightly outward of the sidewalls 39 of a cargo container as seen in FIGS. 5A, 5B and 6. Each cart pin 32 is spaced from the container guide 20 a distance to ensure that, when the cart pin 32 is received in the corner casting hole 34, the corner fitting 36 is held in closely abutting disposition against the container guide 20, thereby also holding the cargo container end 38 against or at least in very close proximity to the container guide 20 as seen in FIG. 5B. The cart pins 32 thus hold the container end 38 against lateral and lengthwise movement on the support surface 26 and the container guides 20 hold the container end 38 against lengthwise movement on the support surface 26. When the front end of one container and the back end of another are supported on the supporting surfaces 26 of the cart, each container end 38 abuts and is spaced from the other container end 38 by container guide 20. See FIG. 3. A container train can be formed in this manner in which the ends 38 of successive pairs of adjacent containers are supported on a handling cart 10. The container pins 32 also allow the two carts supporting the front and back end of a container to maintain a fixed distance using the container's structural rigidity. While the container pins 32 in the illustrated embodiments are shown extending upwardly from the support surface 26, it should be understood that the pins 32 can be attached either directly to the support surface or to any other part of the cart. For example, one or more container pins could extend upwardly from part of the supporting framework underlying the support surface or from a laterally separated component of the cart distinct from the support surface.

Referring again to FIGS. 5A and 5B, container guides 20 have a top surface 40, opposite vertical side faces 42, and sloped or angled surfaces 44 extending upwardly from the vertical side faces 42 to the top surface 40. The sloped surfaces 44 help guide the container end 38 of a container being lowered onto the cart from the position shown in FIG. 5A downward onto the support surface 26 to the position shown in FIG. 5B. However, those of skill in the art will appreciate that the container guides 20 can be in any shape which helps to direct a container end being lowered toward the platform onto the support surface 26. It will also be understood that container guides may be attached either to the top face of the platform or to another part of the cart such as the chassis, side frame members, or other supporting framework.

Referring back to FIGS. 4 and 4A-4C, each cart has one or more lateral container guides 22 attached to the side walls 45 on each side of the cart adjacent support surfaces 26. Each lateral container guide 22 extends upwardly from the side wall 45 and projects above the immediately adjacent support surface 26 for holding container ends 38 being supported on the support surface 26 against lateral slippage. In the illustrated embodiment, lateral container guides 22, like transverse container guides 20, have a sloped inwardly facing guide surface 46 to help direct containers being lowered onto the platform inwardly towards the support surface 26. Those of skill in the art will understand that the degree of slope and shape of the guide surface 46 may vary considerably so long as the surface helps direct the container end towards the support surface. It will also be appreciated that, while in the illustrated embodiment the lateral container guides 22 have a vertical face 48 intermediate the sloped guide surface 46 and the support surface 26, the vertical face 48 is not strictly necessary and the sloped guide surface 46 could extend fully to the support surface 26.

An alternative embodiment of the handling cart is shown in FIG. 4D in which the transversely extending container guides 20 and lateral container guides 22 shown in FIGS. 4A-4C have been replaced with corner container guides 50 mounted on top surface 23. Each corner container guide 50 has orthogonally intersecting outwardly angled side and inner guide surfaces 52, 54, respectively, extending upwardly from the support surface 26 for guiding the corner fittings of a container end being lowered onto the platform toward the support surface 26. Hence, each support surface 26 is bounded lengthwise by inner guide surfaces 54, as indicated partially by broken lines 54A, and cart end edge 28, and widthwise by side guide surfaces 52. It will be understood that in this or any embodiment of the cart, the top surface 23 of the cart may have a width that is greater than the width of a standard cargo container, generally eight feet, to provide sufficient room for corner container guides 50 to be attached thereto and to allow a reasonable amount of clearance transversely between cooperating pairs of corner container guides 50 and lengthwise between corner container guides 50 and cart pins 32 to accommodate the lateral movements of a descending container end. Further, those of skill in the art will recognize that the embodiment shown in FIG. 4D illustrates an example of a handling cart according to the invention in which side and inner guide surfaces are provided which funnel a container end being lowered onto the platform towards the center of the support surface, and that the present invention should not be strictly limited to the side and inner guide surfaces or container guides depicted.

The frame of each cart is supported on wheels 16 (see, e.g., FIGS. 4, 4A and 4B) which may be designed to run on rails in a terminal yard. The cart may optionally be equipped with guide wheels. Alternatively, the frame may be supported with tires to run on paved surfaces. A tire-driven cart may have a steering system to prevent the cart from deviating laterally from a target path, and may be equipped with a guide roller device if dedicated cart-guide structures are installed along a terminal yard road.

Each cart is independently powered by a motor 18 and may have a braking system 19. The motor may be electric, a combustion engine, or any other driving device. A braking system may be integrated into the motor assembly, may be installed separately, or may consist of several different braking mechanisms. For example, a cart may have a parking braking and a separate stopping brake. In some embodiments, the cart drive system may include a traveling control system, sensors, motors, gear reducers, shafts, bearings, couplings, and/or wheels to provide adequate speed control, acceleration/deceleration and stopping capabilities depending on the performance required. All of the wheels may be powered, although the device may be designed to have idler wheels. The traveling control system may output electric power to drive motors by a command signal transmitted from a cart control system. The movement of individual carts can be synchronized electronically to coordinate movements among the carts formed into a "train."

The carts are each, at a minimum, designed to support the weight of two container ends and to withstand impact, acceleration, deceleration, and inertial forces acting on the carts during loading and unloading, traveling, stopping and other load conditions. Each cart may be equipped with a suspension system 21 or with suitable shock absorbers, cushions or springs provided between the cart's frame and support surfaces.

Turning to FIGS. 7A-7D and 8, a mechanism for lifting a container handling cart 10 via a standard twistlock is illustrated. A crane spreader 60 is a large machine commonly supported on cables extending from a crane and is used to lift and move heavy objects such as cargo containers. A crane spreader is capable of expanding to accommodate containers of varying lengths. Crane spreaders are commonly equipped with twistlock mechanisms 62 for holding the corner fittings of containers. The container guides 20 of the cart may optionally be hollow or can be provided with one or more cavities or recesses 64 accessible through a top opening 66. It will be understood that such a cavity or recess may be provided by a multitude of means such as in a standalone box mounted on the cart. In the illustrated embodiment seen in FIG. 8, the top opening has an oblong shape and is sized to receive the twistlock 62. It will be noted that the top opening need only be an elongated opening appropriately sized to receive a twistlock. The cavity 64 is large enough to permit the twistlock 62 to rotate once it is fully received therein as shown in FIG. 7B, such that the twistlock is secured in the cavity as shown in FIG. 7C. In this manner, a crane spreader having twistlocks 62 can be used to catch and lift a cart 10 to move it to a desired location. See FIG. 7D. In alternate embodiments, a receiving cavity can be provided elsewhere than in the container guide 20, such as in a box on top of the container guide or located off the sides of the support surfaces 26. It will be appreciated by those of skill in the art that there are other means to facilitate lifting and handling of carts, e.g., by equipping the carts with lugs, providing cutaways for forklifts, or incorporating jacking pads.

Figure 9A:
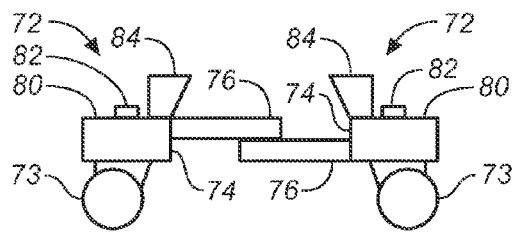
FIG. 9A is an elevational view of an embodiment of a cargo container handling cart having frame members arranged in pivoting relation.
Figure 9B:
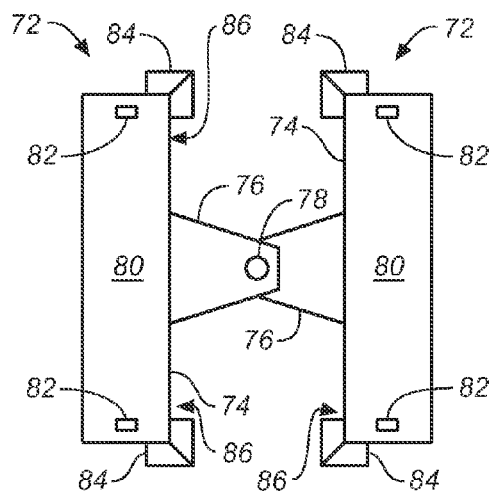
FIG. 9B is a plan view of the pivoting cargo container handling cart shown in FIG. 9A with the frame members arranged in parallel disposition.
Figure 9C:
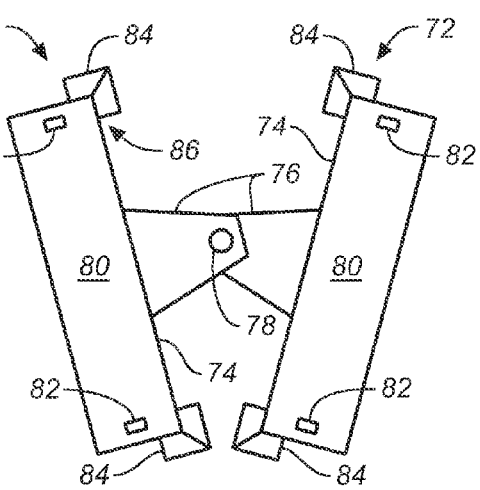
FIG. 9C is a plan view of the pivoting cargo container handling cart shown in FIGS. 9A and 9B with the frame members shown pivoted at an angle.

A pivoting embodiment 70 of a cargo container handling cart is shown in FIGS. 9A-9C. The pivoting embodiment, like the embodiment discussed above, has two end portions 72 supported on wheels 73, each end portion having an inner edge 74. A pivot arm 76 extends inwardly from each inner edge 74. The pivot arms overlap and are pivotally joined about a pivot pin 78 which provides a vertical pivot axis about which the end portions 72 mutually pivot. The ability of the end portions 72 to pivot permits the cart or a container train formed using multiple handling carts to run on curved tracks. A pivot cart may be equipped with a steering control system and a pivot angle control system.

Figure 10A:
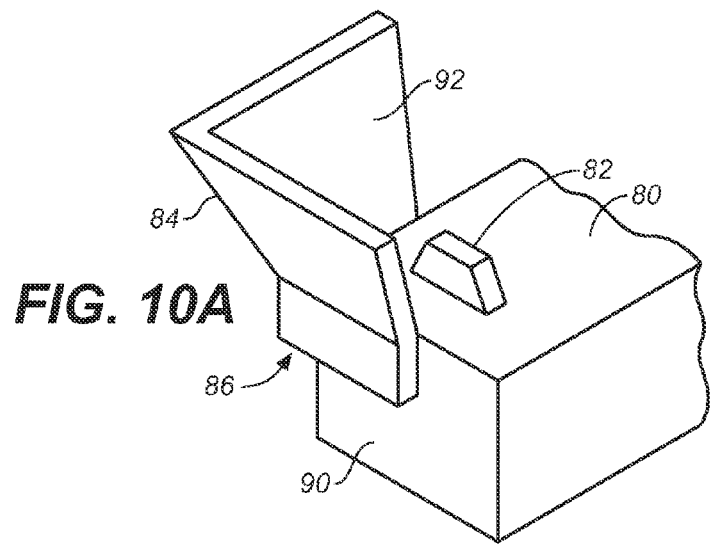
FIG. 10A is an enlarged upper perspective view of a corner guide of the pivoting cargo container handling cart shown in FIGS. 9A-9C.
Figure 10B:
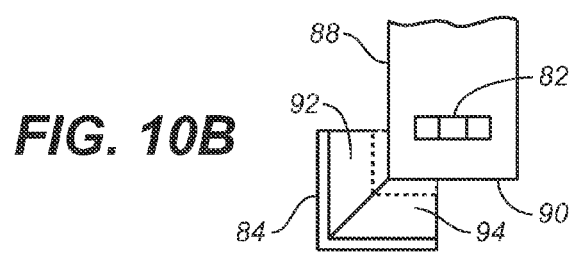
FIG. 10B is a plan view of the corner guide shown in FIG. 10A.

Each end portion 72 includes a support surface 80 having cart pins 82 for mating engagement with the corner casting holes of corner fittings as discussed above. Corner guides 84 are provided at each inner corner 86 of each end portion 72. With additional reference to FIGS. 10A and 10B, each corner guide 84 is attached to the inner side 88 and lateral side 90 of the inner corner 86 of each end portion 72, and has orthogonally intersecting outwardly angled inner and side guide surfaces 92 and 94, respectively, extending upwardly above the support surface 80 for guiding the corner fittings 36 of a container end being lowered onto said end portion toward the support surface 80 and onto the cart pins 82.

Figure 11:
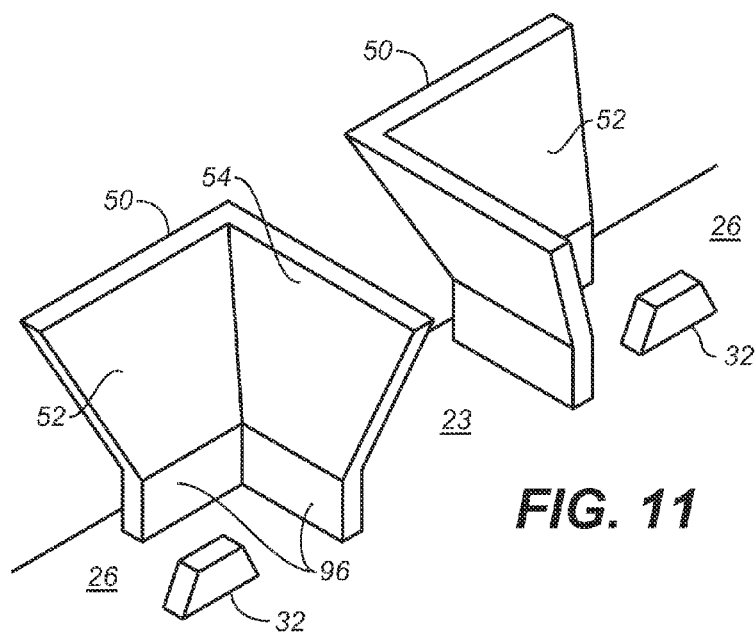
FIG. 11 is an enlarged upper perspective view of the corner guides and cart pins on the upper surface of the cargo container handling cart shown in FIG. 4D.

An enlarged view of container guides for the handling cart shown in FIG. 4D is illustrated in FIG. 11. Two spaced-apart corner container guides 50 are secured to the top surface 23 of the cart. Each corner guide has orthogonally intersecting outwardly angled side and inner guide surfaces 52 and 54, respectively, for guiding the corner fittings of a container end being lowered onto said end portion toward one of the support surfaces 26 and onto the cart pins 32. Optionally, vertical faces 96 are provided as positive abutment surfaces for a container end being supported on one of the support surfaces 26.

Figure 9D:
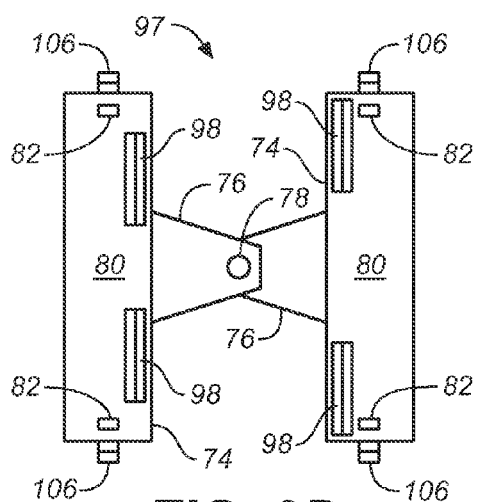
FIG. 9D is a plan view of another embodiment of a pivoting cargo container handling cart.
Figure 9E:
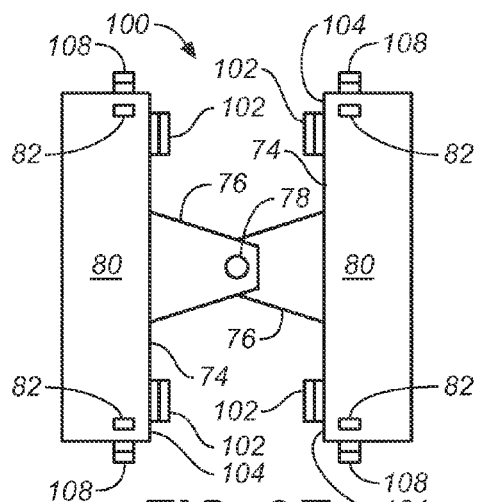
FIG. 9E is a plan view of yet another embodiment of a pivoting cargo container handling cart.

Alternate embodiments of a pivoting cart such as that shown in FIGS. 9A-9C are seen in FIGS. 9D and 9E. The pivoting cart 97 shown in FIG. 9D includes transverse container guides 98 on each of the support surfaces 80 for guiding a container end onto the support surface 80. The embodiment 100 shown in FIG. 9E includes inner edge container guides 102 extending upwardly from the inner edge 104 of each of the support surfaces 80. And each of the embodiments 96, 100 also includes upwardly extending lateral container guides 106, 108, for guiding a descending container end onto one of the support surfaces 80.

Figure 12:
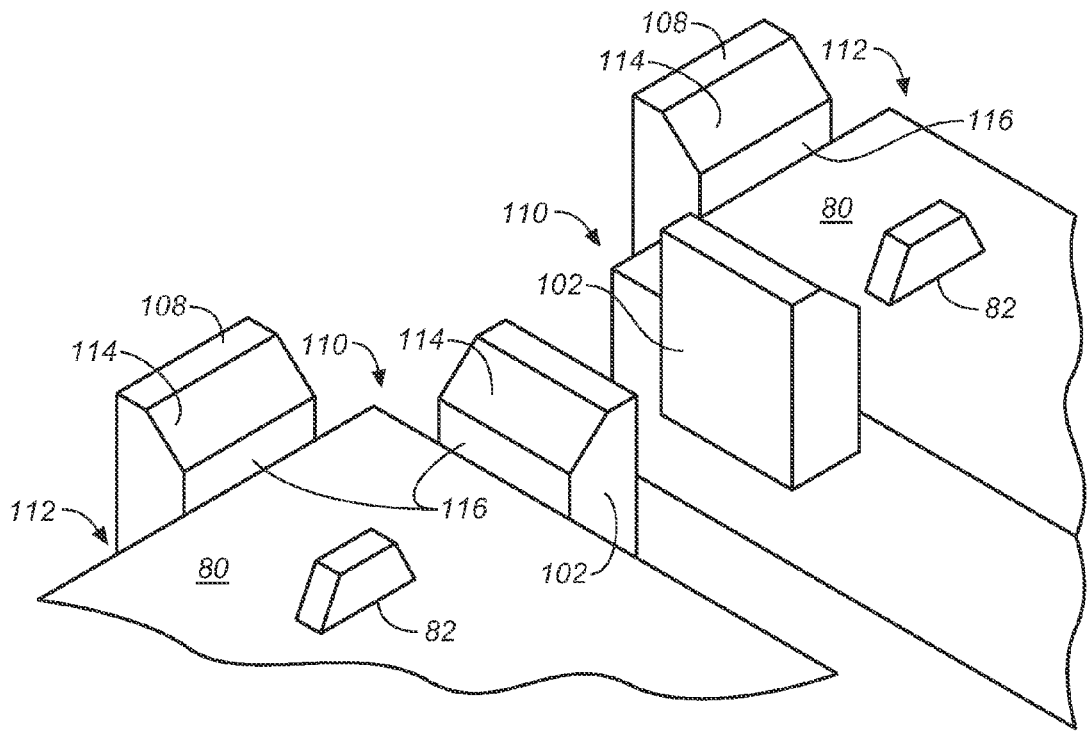
FIG. 12 is an enlarged upper perspective view of the side and inner end guide brackets and cart pins on the upper surface of the cargo container handling cart shown in FIG. 9E.

A close-up view of the container guides for the pivoting embodiment of the handling cart shown in FIG. 9E is illustrated in FIG. 12. Inner end and lateral container guides 102 and 108, respectively, are provided at the inner corners 110 of each frame member 112 of a pivoting container handling cart. Each container guide 102, 108 has a sloped surface 114 for guiding container ends toward the support surfaces 80 and onto cart pins 82. Optionally, vertical faces 116 are provided as positive abutment surfaces for a container end that is resting on one of the support surfaces 80.

Figure 13:
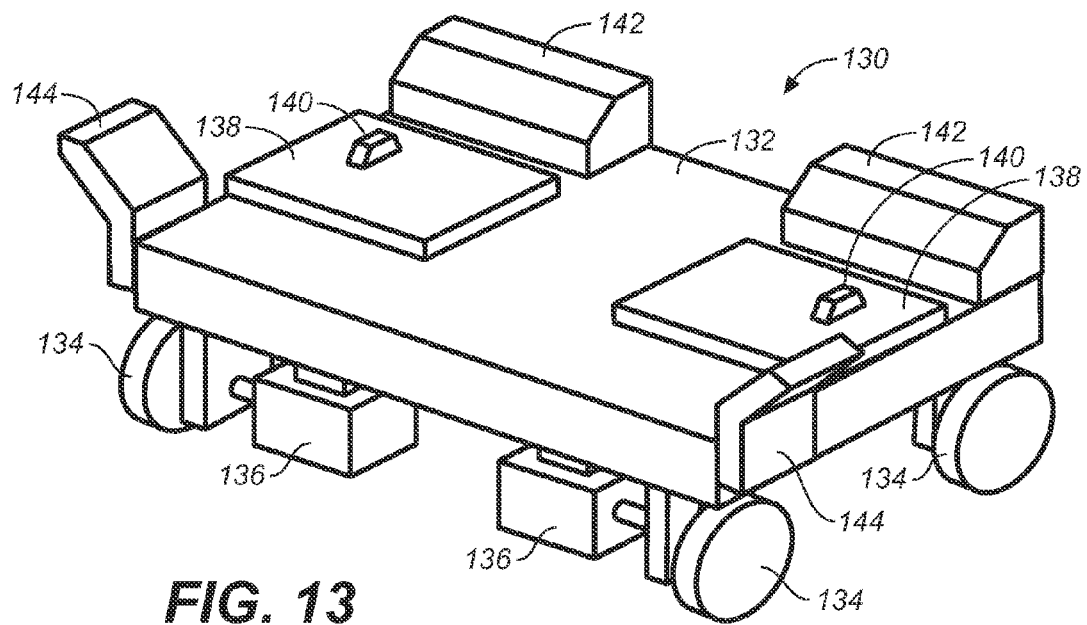
FIG. 13 is an upper perspective view of a "one end" cargo container handling cart.

An alternate embodiment of a cargo handling cart engineered to carry only one end of a container is generally indicated at 130 in FIG. 13. Two such "one end" carts can be used to carry one cargo container, one cart supporting each end of the container. Each cart 130 comprises a frame 132, wheels 134, and motor and braking systems 136 such as discussed above. Corners of containers rest on support surfaces 138, each support surface having a cart pin 140 for mating engagement with the corner casting holes of corner fittings as discussed above. In the illustrated embodiment, one or more outer container guides 142 abut and guide the leading or trailing edges of a descending container onto support surfaces 138 and lateral container guides 144 guide the sides of the container onto the support surfaces 138. In addition to or instead of the outer container guides 142 and lateral container guides 144, the cart may be provided with corner guides of the type discussed above.

Figure 14:
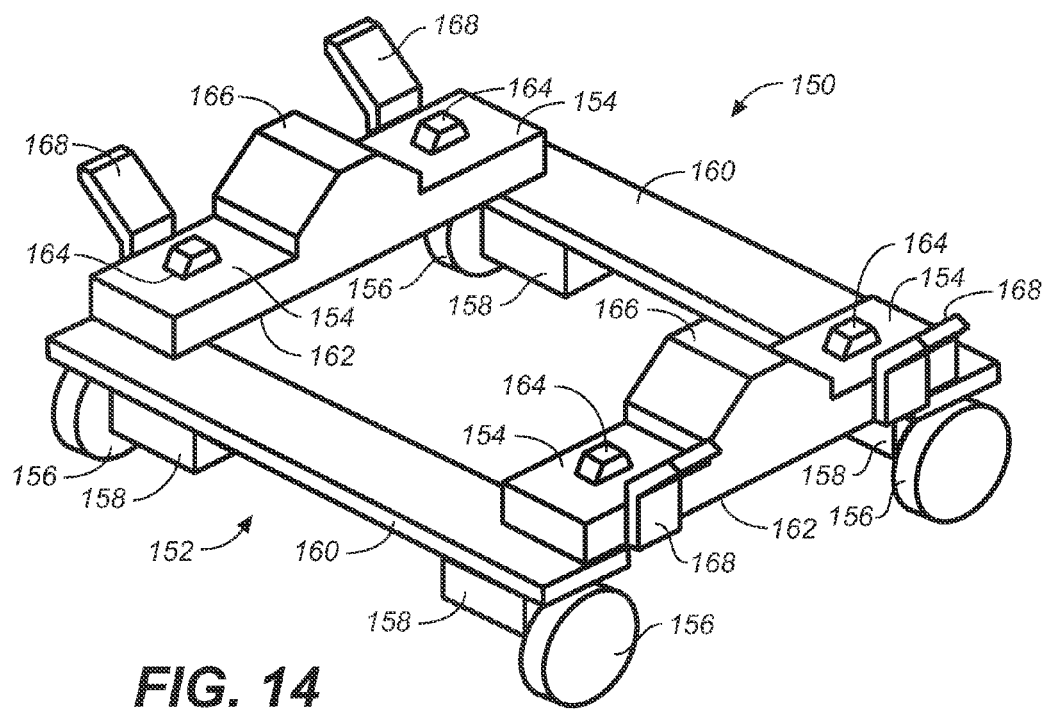
FIG. 14 is an upper perspective view of another embodiment of a cargo container handling cart having a stripped down frame.

Another embodiment of a cargo container handling cart is shown in FIG. 14 at 150. This embodiment is similar to that shown in FIGS. 4A-4C except in the arrangement of the frame 152 and support surfaces 154. Each cart 150 comprises a frame 152, wheels 156, and motor and braking systems 158. The frame 152 includes transverse frame members 160 extending across the width of the cart, each member 160 being support by one pair of wheels 156. Bridge beams 162 on each side of the cart extend between and connect frame members 160. The forward and rear top surfaces of each bridge beam 162 form support surfaces 154 for receiving and supporting the corners of a cargo container. Each support surface 154 has a cart pin 164 for engaging the corner casting hole of the corner fitting of a container as discussed above. Centrally disposed container guides 166 are provided on each bridge beam 162 and lateral container guides 168 extend upwards from the sides of the bridge beams 162 for guiding descending cargo containers onto support surfaces 154. It should be readily understood that the number and placement of cart pins and container guides may vary.

Figure 15:
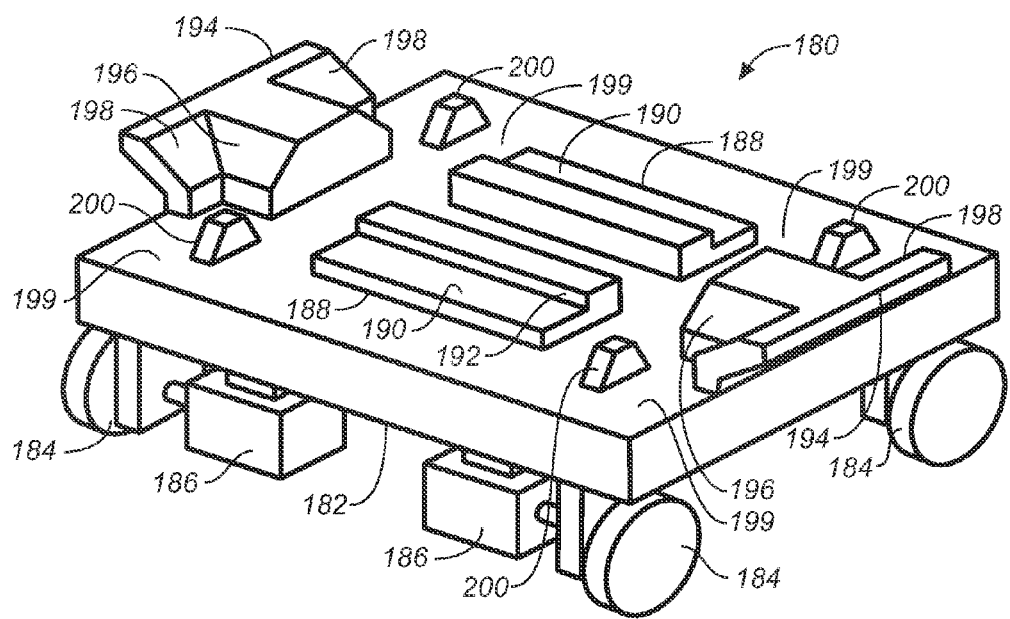
FIG. 15 is an upper perspective view of another embodiment of a cargo container handling cart having two lateral container guides having sloped inner and side guide surfaces, two container edge support structures, and cart pins.
Figure 15A:
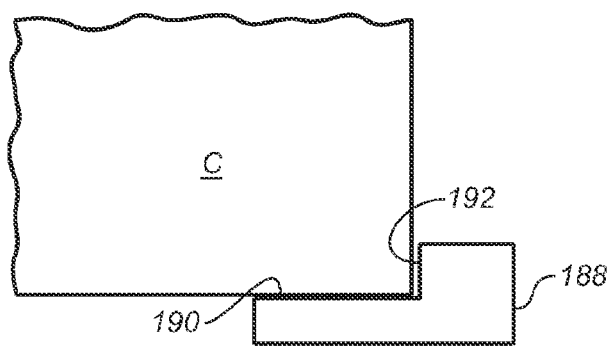
FIG. 15A is a partial sectional view of a container end resting on a container edge support structure of the type shown in FIG. 15.

A further embodiment of a cargo container handing cart, similar to that shown in FIGS. 4A-4C, is shown in FIG. 15 at 180. Each cart 180 comprises a frame 182, wheels 184, and motor and braking systems 186. One or more edge support structures 188 are disposed on the frame 182 to support one or more edges of a cargo container. Each edge support structure 188 includes an edge support surface 190 for holding a container edge and an optional vertical face 192 to limit lateral movement of the container C. See FIG. 15A. Container guides 194 incorporate orthogonally intersecting outwardly sloped side and inner guide surfaces, 196 and 198 respectively, extending upwardly from the top surface 199 of the frame 182 for guiding the corner fittings of a descending container onto the top surface 199 and the edge of the container onto edge support surface 190 of the edge support structures 188. Cart pins 200 extending upwardly from the frame 182 engage with the corner casting holes of the corner fittings of the container as discussed above.

Figure 16:
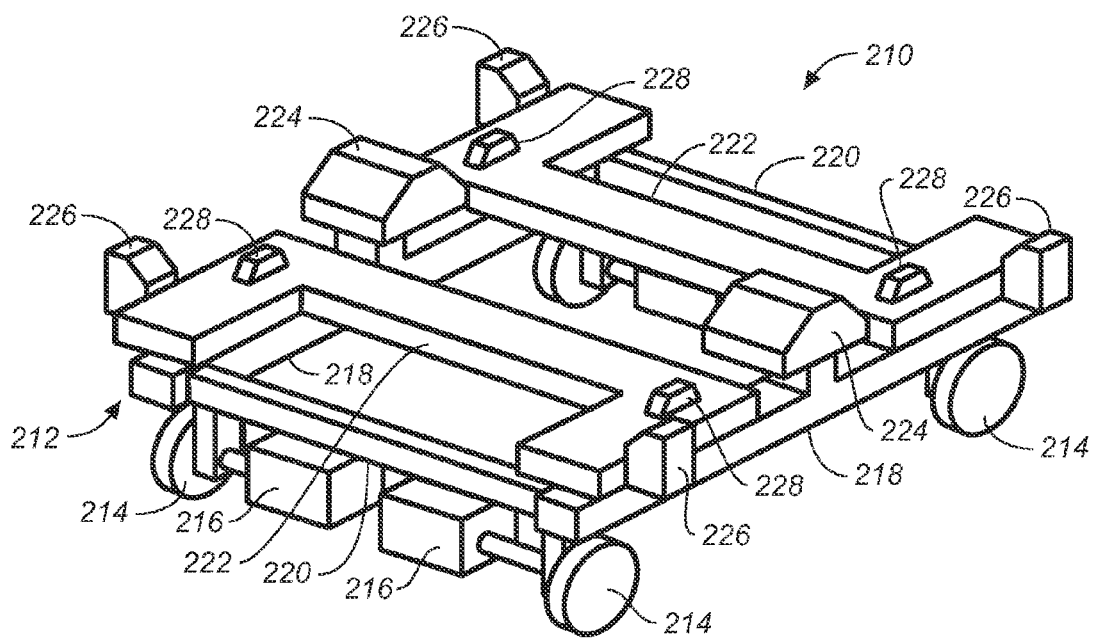
FIG. 16 is an upper perspective view of another embodiment of a cargo container handling cart having two separated container end support surfaces each having a generally C-shaped geometry and two container guides mounted directly on the frame.

The support surface of a cargo container handling cart may be shaped in any fashion that effectively supports the end of a cargo container. An embodiment of a cargo container handling cart having shaped support surfaces is shown in FIG. 16 at 210 and comprises a frame 212, wheels 214, and drive, motor and braking systems 216. The frame 212 comprises side beams 218 supported by wheels 214, and transverse members 220 extending between and joining side beams 218. C-shaped support surfaces 222 are supported by the frame 212. Each C-shaped support surface 222 provides a continuous support surface for the end and side edges of one end of a cargo container thereby providing additional stability for the supported container. Transverse container guides 224 mounted to the side beams 218 of frame 212 and lateral container guides 226 extending upwardly from the side edges of support surface 222 guide descending containers onto support surfaces 222. Cart pins 228 are provided on the support surfaces 222 for engaging the corner casting holes of the corner fittings of a container. As exemplified by container guides 224, the support and guide components of a container handling cart, e.g., the transverse container guides 224, lateral container guides 226, and cart pins 228, may be attached directly to the frame 212 or to another component of the cart. It will also be noted that by eliminating a portion of a table top style support surface, such as in the embodiment shown in FIGS. 4 and 4A-4C, in favor of the smaller strategically placed support surfaces discussed in the last three embodiments above, the overall weight of the cart is lighter making the cart even easier to maneuver.

Figure 17:
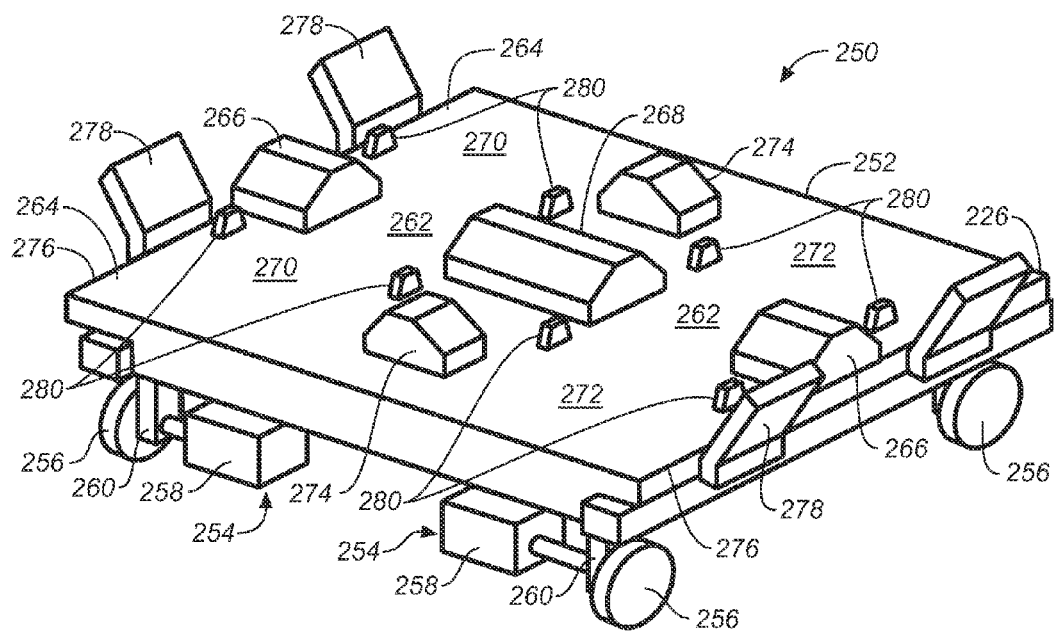
FIG. 17 is an upper perspective view of a tandem embodiment of a cargo handling cart capable of carrying the ends of two containers on each end portion of the cart.
Figure 17A:
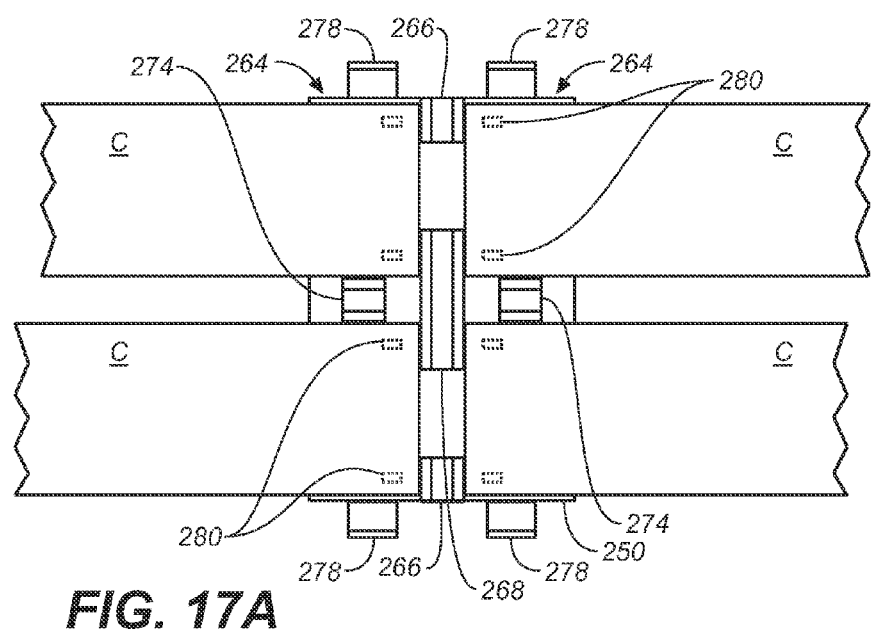
FIG. 17A is a plan view showing the ends of four cargo containers being supported on the container handling cart shown in FIG. 17.

The embodiment of a handling cart, indicated at 250 in FIG. 17, is similar to embodiment 10, shown in FIG. 4, but will support four container ends rather than just two container ends. Each cart 250 in this embodiment comprises a structural frame 252 and a cart drive system 254 including wheels 256, motor and braking systems 258, a suspension system 260, and one or more power sources (not shown). The top surface 262 includes two end portions 264 between which are mounted transverse container guides 266, 268. In the illustrated embodiment, container guides consist of outer container guides 266 and inner container guide 268, but it is intended that the configuration or arrangement of the container guides disposed between the two end portions 264 not be so limited. Each end portion 264 is functionally separated into first and second support surfaces 270, 272, each support surface having a width suitable for supporting a standard cargo container C. Support surfaces 270, 272 on each end portion 264 are separated by medial container guides 274, disposed perpendicularly to the transverse container guides 266, 268. The medial container guides 274 effectively define the interior boundary of the support surface. The outer boundaries of support surfaces 270, 272 are defined by the side edges 276 of the cart and by lateral guides 278. Two cart pins 280 are provided on each support surface, 270, 272 for engaging the corner casting holes of the lower corner fittings of a container end as discussed above. The configuration of cart 250 will thus permit handling of the ends of two containers C in tandem on each end portion 264 as shown in FIG. 17A.

In the embodiments of the invention described above the cart pin is described as extending vertically to engage the corner casting hole in the bottom of the corner fitting of a container C. However, corner fittings 230 are commonly provided with corner casting holes 232 located on the sides of the fitting as well as on the bottom of the fitting. See FIG. 6. In another aspect of the invention, a container handling cart 234 includes laterally extending cart pins 236 for engaging with the side corner casting holes as shown in FIGS. 18A and 18B. Each pin 236 is disposed in a housing 238 and is moveable from a retracted position, as shown in FIG. 18A, to an extended position, shown in FIG. 18B, in which the container C is locked in place by the pins 236.

A cargo container handling system according to the invention is supported and operated by a number of control systems. A cart control system may consist of computer control systems having peripheral devices, sensors, data communication systems, monitoring systems, emergency systems, and power backup systems. The cart control system may communicate with the traveling control system of a cart drive system, a cart communication system, a position identification system, an anti-collision system, and a power control system. The cart control system may also communicate with the terminal operation system and the cart control system of other separate groups of carts by using the cart communication system.

All of the motions and functions of each cart may be controlled and monitored by the cart control system using devices and systems onboard the cart.

In the case of an electric motor driven cart, the electric source may come from an external connection via cabling, an electric rail, an inductor system, through use of an electric-generator set, onboard batteries, or any other type of power storage or delivery system. The power control system may manage and monitor the electric power source used for the cart. The power source may also consist of more than one power source.

A cart may have one or more features to allow other machinery to lift the carts. The cart may have corner casting holes located on the structure to allow a crane to lift cart body with the crane's twistlock device to catch and lift the cart to shift it from one position to another.

An anti-collision system may be optionally provided to avoid collisions with other carts or objects. Each cart may be equipped with sensors which may output data calling out the range to a nearby object or the presence of an object detected within a predetermined zone. The anti-collision system may communicate with the cart control system.

Cart securing devices may be incorporated into the handling carts to secure their location at a determined position, e.g., on a terminal runway. A cart securing device may consist of parking devices on the cart and sockets on the runway. The parking device may consist of electric driven cylinders, push-rods, support frames, sensors, and control units. The socket may be installed on the runway either on the ground or in a structure fixed to the ground. A push rod can be activated by the cart control system to be insert into or released from the socket.

The cart may use a Position Tracking System (PTS) to determine the location of a cart within a predetermined area and assist with its automated operation and management. A position fixing mechanism incorporated on the cart works in cooperation with the PTS to enable the precise location of each cart to be sensed and to fix the cart in that location or to release a cart from that location. One embodiment of a position fixing mechanism is shown in FIGS. 19A and 19B in which a positioning pin 240 is located on the underside of cargo container cart 242 and positioning holes 244 are set in predetermined locations on the ground. The pin 240 is moveable from a retracted position shown in FIG. 19A to a descended position shown in FIG. 19B in which the pin is extended into a selected hole 244 to precisely position the cart in a fixed location. In this manner carts 242 may be locked in a selected position determined by the position of each hole 244. This assists in positioning adjacent carts at preset distances to accommodate placement of containers of varying lengths on them and helps better withstand lateral shocks experienced during loading and unloading which could otherwise move the carts out of position. As seen in FIG. 19C a distance DH between two holes 244 may correspond to the distance DC between the container guides 248 of two adjoining carts 242. Hence, if two container carts 242 are established in positions associated with holes separated by distance DH, they will be in proper position for placement thereon of a container of length DC. This simplifies the process of creating the appropriate spacing between container carts for loading and unloading containers. Each hole 244 may be shaped with a sloped upper edge 248 to help guide pin 240 into the hole. The container positioning pin 240 may be actuated by any means including by linear motor, electric motor, and hydraulic, pneumatic, and other linear actuators. The pin itself may also be a simple spring loaded latch that is mechanically lifted to free it from the positioning hole.

The PTS may also consist of an onboard cart locating system and/or location sensor systems. One possible PTS method is to use GPS systems. The cart locating system incorporated with GPS sensor is designed to communicate with the onboard cart control system, and to output the cart location data captured by GPS while the cart is traveling.

Another possible PTS uses markers as reference points along the cart runway and sensors on the cart for detecting the reference points to determine cart location. Suitable markers could consist of magnetic markers, such as a magnetic strip or strips, electronic markers, such as lasers or other optical markers, or physical markers. Sensors would be appropriately selected to detect the markers. One cart locating system, which functions to read location data from markers by using the marker sensors, outputs cart location data while the cart is traveling. Another PTS uses encoders on the wheels to detect wheel rotations. This design could also use the sensor and marker arrangement to reduce errors in the encoder readings. Any PTS can use a combination of technologies.

Any PTS may communicate cart location data to the cart control system while the cart is traveling.

For container train operations, multiple carts must operate in a coordinated manner, which may require synchronization. One method of synchronization is to use a master/slave system. Carts will form a container train, consisting of one "master" cart and the remaining "slave" carts. Each cart may have the communication systems to exchange data with the upper Terminal Operation System (TOS) and/or directly with the cart control system of other carts. The master cart travels and stops according to instructions from the TOS, and other carts follow the master cart motion with the use of the synchronization system.

As an alternative, the synchronization system can operate by using laser, ultrasonic, or other forms of distance sensors. Each cart determines the distance to the cart ahead of it, and maintains a fixed distance by adjusting its speed. Wireless communications may optionally be used to coordinate the carts, or infrared markers may simply be used to identify the carts to each other and establish a movement order. The carts can be told to follow another, specific cart, identified by its infrared broadcast.

The synchronization system can either be centralized or decentralized. For simple operation schemes, such as for linear movement along tracks, the carts can operate independently and follow the cart ahead of it. For more sophisticated operations, a central controller can communicate and coordinate the entire cart operation, forming trains to transport groups of containers, and breaking them down or reassigning them to other trains, and/or issuing movement instructions.

The spacing between the carts is determined by the size of the container to be handled. A pair of carts, which are waiting to receive a container from the crane, will position themselves with the appropriate spacing by command of the TOS.

The cargo container handling cart according to the invention may consist of a main structure, wheels with a drive system, one or more container guides, cart handling lugs, container holding pins, cart positioning device, cart control system, power feeding and storage systems, cart communication system, position identification system, synchronization system, and/or anti-collision system.

Figure 1:
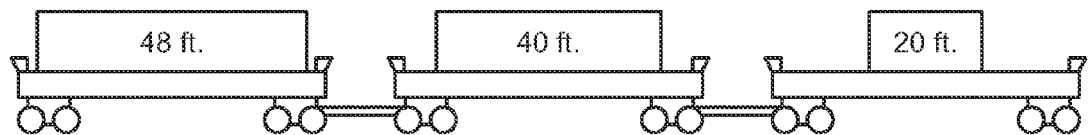
FIG. 1 is an elevational view of a prior art multi-chassis container transport system.
Figure 2:
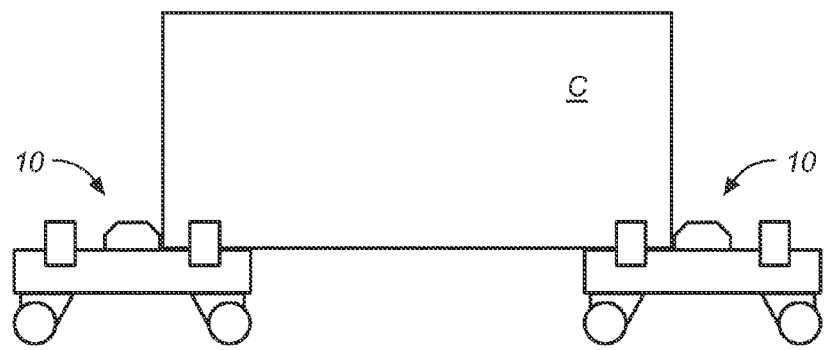
FIG. 2 is an elevational view of a container being supported on each end by a cargo container handling cart according to the invention.

Each cart is designed to load and hold two different container ends, one container end on each support surface of the cart deck. Two carts are used to hold or carry a container, one cart holding the front end of a container on its rear deck or support surface and another cart holding the rear end of the container on its front deck or support surface at the same time. And, more than three carts will hold and carry more than two containers as when forming a container "train." Optionally, the cart may be constructed with a pivoting construction to facilitate traveling on curved runways. Empty carts occupy considerably less space than conventional container transporters, thereby reducing congestion. See FIGS. 1 and 3.

There have thus been described and illustrated certain preferred embodiments of a cargo container handling cart and system according to the invention. Although the present invention has been described and illustrated in detail, it is clearly understood that the same is by way of illustration and example only and is not to be taken by way of limitation, the spirit and scope of the present invention being limited only by the terms of the appended claims and their legal equivalents.

We claim:

1. A handling cart for handling one or more cargo containers, each cargo container having two container ends, each container end having lower edges and two lower corner fittings, each corner fitting having one or more corner casting holes, the handling cart comprising:
   a frame supported on wheels, said frame having at least one support surface for supporting one of the container ends of a cargo container,
   at least one container guide mounted on said frame, said container guide having a sloped surface, upon engagement with one of the lower edges or one of the lower corner fittings of a descending container end said sloped surface guiding the container end onto said at least one support surface, and
   one or more cart pins mounted on said frame, each cart pin engaging one of the one or more corner casting holes of one of the lower corner fittings of a container end resting on said at least one support surface thereby restricting said container end against horizontal movement on said support surface, said cart pins spaced from said at least one container guide such that when said cart pins are engaged with the corner casting holes of the container end the corner fittings are held in abutting relation with said at least one container guide.

2. The handling cart of claim 1 wherein:
   said at least one container guide having at least one vertical face for abutting a container end resting on said at least one support surface.

3. The handling cart of claim 1 wherein:
   said at least one support surface has a width at least substantially equivalent to the width of a cargo container.

4. A handling cart for handling one or more cargo containers, each cargo container having two container ends, each container end having two lower corner fittings, each corner fitting having one or more corner casting holes, the handling cart comprising:
   a frame supported on wheels, said frame having at least two support surfaces, each of said two support surfaces for supporting one of the container ends of a cargo container, each of said support surfaces having a width at least substantially equivalent to the width of a cargo container,
   at least one container guide mounted on said frame, said at least one container guide disposed between said two support surfaces for horizontally abutting a container end supported on one or both of said two support surfaces, such that container ends resting on said two support surfaces are spaced apart by said container guide, and one or more cart pins extending upwardly from each of said two support surfaces, each cart pin for engaging one of the one or more corner casting holes of one of the lower corner fittings of a container end for holding the container end on said at least one support surface, said cart pins spaced from said at least one container guide such that, when said cart pins are engaged with the corner casting holes of the corner fittings of a container end resting on one of said two support surfaces, the corner fittings are held in abutting relation with said at least one container guide.

5. The handling cart of claim 4 wherein:
said container guide having two vertical faces, each said face for abutting a container end resting on one of said two support surfaces.

6. The handling cart of claim 4 wherein:
said container guide has two sloped surfaces each for guiding a descending container end onto one of said two support surfaces.

7. The handling cart of claim 1 wherein:
said at least one container guide is comprised of a plurality of corner guides each having orthogonally intersecting outwardly sloped side and inner guide surfaces extending upwardly from said platform for guiding the corner fittings of a descending container end onto said support surface.

8. A handling cart for handling one or more cargo containers, each cargo container having two container ends, each container end having two lower corner fittings, each corner fitting having one or more corner casting holes, the handling cart comprising:

a frame supported on wheels, said frame having at least one support surface for supporting one of the container ends of a cargo container, one or more cart pins mounted on said frame, each cart pin for engaging one of the one or more corner casting holes of one of the lower corner fittings of a container end for holding the container end on said at least one support surface, said cart pins spaced from said at least one container guide such that, when said cart pins are engaged with the corner casting holes of the corner fittings of a container end resting on said at least one support surface, the corner fittings are held in abutting relation with said at least one container guide, and at least one container guide mounted on said frame, said at least one container guide for horizontally abutting a container end supported on said at least one support surface, said at least one container guide having a top surface and one or more internal cavities, said top surface having one or more top openings each in communication with one of said cavities, said top opening having an elongated configuration suitable for receiving a twistlock of a crane spreader, each said cavity sized to permit rotation of a twistlock received in said cavity.

9. A handling cart for handling one or more cargo containers, each cargo container having two container ends, each container end having two container sides and two lower corner fittings, each corner fitting having one or more corner casting holes, the handling cart comprising:

a frame supported on wheels, said frame having two opposite sides and at least one support surface, said at least one support surface for supporting one of the container ends of a cargo container, one or more cart pins mounted on said frame, each cart pin for engaging one of the one or more corner casting holes of one of the lower corner fittings of a container end for holding the container end on said at least one support surface, wherein said cart pins are spaced from said at least one container guide such that, when said cart pins are engaged with the corner casting holes of the corner fittings of a container end resting on said at least one support surface, the corner fittings are held in abutting relation with said at least one container guide, at least one container guide mounted on said frame, said at least one container guide for horizontally abutting a container end supported on said at least one support surface, and one or more lateral container guides, each said lateral guide extending upwardly from one of said sides of said frame for horizontally abutting one of the container sides of a container end resting on said at least one support surface.

10. The handling cart of claim 9 wherein:
each said one or more lateral container guides having a vertical side face for abutting the container side.

11. The handling cart of claim 10 wherein:
each said lateral container guide has a sloped guide surface extending upwardly from said vertical side face for guiding a descending container end onto said at least one support surface.

12. The handling cart of claim 1 further comprising:
one or more motors for driving said wheels.

13. The handling cart of claim 12 further comprising:
one or more braking systems for restricting movement of said wheels.

14. The handling cart of claim 12 further comprising:
one or more power sources for activating said motor.

15. The handling cart of claim 12 further comprising:
a suspension system.

16. The handling cart of claim 1 wherein:
said frame has a length substantially less than the length of a cargo container.

17. The handling cart of claim 1 wherein:
said frame has a length substantially less than twenty feet.

18. The handling cart of claim 1 wherein:
said frame has a length substantially less than twelve feet.

19. The handling cart of claim 1 wherein:
said at least one support surface has a length less than six feet.

20. The handling cart of claim 1 wherein:
said frame is comprised of two frame members, each said frame member supported on wheels and having an inner edge, said frame members pivotally engaged about a vertical axis between said inner edges.

21. The handling cart of claim 20 further comprising:
overlapping pivot arms extending inwardly from said inner edges of said end portions, said arms pivotally engaged about a pivot pin forming said vertical axis.

22. The handling cart of claim 20 further comprising:
each of said frame members having at least one support surface and two inner corners, each said inner corner having a corner guide for abutting the corner fitting of a container end resting on said support surface.

23. The handling cart of claim 22 further comprising:
each said corner guide having orthogonally intersecting upwardly extending sloped side and inner guide surfaces for guiding the corner fittings of a descending container onto said support surface.

24. The handling cart of claim 20 further comprising:
each of said frame members having at least one support surface and two lateral container guides each having a sloped guide surface for guiding a descending container end onto said at least one support surface.

25. The handling cart of claim 24 further comprising:
said at least one support surface having at least one container edge support structure for supporting an edge of a container end resting on said at least one support surface.

26. The handling cart of claim 25 further comprising:
said at least one support surface having an inner edge and at least one inner end container guide having a sloped guide surface for guiding a descending container end onto said at least one support surface.

27. The handling cart of claim 1 wherein:
said frame is comprised of a pair of transverse frame members and a pair of bridge beams extending between said transverse frame members, each frame member supported by one or more wheels, each bridge beam having two of said at least one support surfaces and a container guide between said two support surfaces.

28. The handling cart of claim 27, further comprising:
the container end having container sides, and
each said bridge beam having one or more upwardly extending lateral container guides for horizontally abutting one of the container sides of a container end resting on said support surfaces.

29. The handling cart of claim 1, the container ends of the containers having container edges, the handling cart further comprising:
one or more edge support structures mounted on said frame, each said edge support structure having a flat support surface for holding a container edge of a container end.

30. The handling cart of claim 29 wherein:
each of said one or more edge support structures has a vertical face for abutting the container edge to restrict the container end against horizontal movement on said at least one support surface.

31. The handling cart of claim 30 further comprising:
said one or more container guides having orthogonally intersecting sloped side and inner guide surfaces for guiding the corner fittings of a descending container onto said at least one support surface.

32. The handling cart of claim 31 wherein:
said at least one support surfaces is comprised of two support surfaces,
said one or more edge support structures is comprised of at least two said edge support structures, each edge support structure mounted on one of said two support surfaces, and
said one or more container guides is comprised of at least two container guides, at least one of said container guides mounted on each of said two support surfaces.

33. The handling cart of claim 1, the container end having container edges, wherein:
said at least one support surface is comprised of at least one support surface having a generally C-shaped geometry dimensioned to correspond with and underlay the container edges of the container end.

34. The handling cart of claim 33 further comprising:
two spaced apart container guides mounted on said frame, said container guides spaced from said at least one support surface for horizontally abutting a container end supported on said at least one support surface.

35. The handling cart of claim 34, the container end having container sides, the handling cart further comprising:
said at least one support surface having one or more lateral container guides for horizontally abutting one of the container sides of a container end resting on said at least one support surface.

36. The handling cart of claim 1, the corner fittings each having a laterally facing corner casting hole, the handling cart further comprising:
one or more cart pin housings mounted on said frame,
a cart pin received in each of said one or more cart pin housings, said cart pin movable between an extended position and a retracted position, said extended position for inserting said cart pin in the laterally facing corner casting hole of one of the corner fittings of a container end resting on said at least one support surface, and said retracted position for said cart pin being removed from the corner casting hole.

37. The handling cart of claim 1 further comprising:
a positioning pin extending downwardly from said frame, said positioning pin vertically downwardly extendable for insertion of said pin into one of one or more positioning holes in the ground for anchoring said handling cart in a precise position associated with the location of the positioning hole.

38. The handling cart of claim 37 further comprising:
one or more positioning holes each having a sloped upper surface for guiding said positioning pin into said positioning hole.

39. The handling cart of claim 38 wherein:
said one or more positioning holes is comprised of a series of holes having a predetermined spacing permitting two adjacent carts to be positioned at a distance appropriate for loading a cargo container on said carts.

40. The handling cart of claim 1, each container end also having side edges, wherein:
said frame has two end portions, each said end portion having two of said support surfaces, one or more of said cart pins mounted on each of said support surfaces for holding one container end of a cargo container on said support surface, such that each of said two end portions is capable of simultaneously handling two container ends.

41. The handling cart of claim 40 wherein:
one or more transverse container guides are interposed between said two end portions for horizontally abutting a container end supported on one or more of said support surfaces.

42. The handling cart of claim 41 wherein:
one or more medial container guides are interposed between said two support surfaces on each of said two end portions for horizontally abutting the side edges of container ends supported on one or both of said support surfaces on one of said end portions.

43. The handling cart of claim 42 wherein:
each of said transverse and medial container guides having a sloped surface for guiding a descending container end onto one of said support surfaces.

44. A handling cart for handling one or more cargo containers, each cargo container having two container ends and a predetermined container width, each container end having two container sides and two corner fittings, each corner fitting having a downwardly facing corner casting hole, the handling cart comprising:
a frame supported on wheels, said frame having two support surfaces, two cart end edges and at least one centrally disposed container guide, each support surface having two cart pins, each support surface bounded by said container guide and one of said cart end edges, and having a width at least substantially equivalent to the container width, and a length less than six feet, each said support surface for supporting one of the container ends, said two cart pins extending upwardly from said support surface between said container guide and said cart end edge for mating engagement with the corner casting hole of the corner fitting of a container end resting on said support surface for holding the container end on said support surface, said cart pins spaced from said container guide a distance such that when said cart pins are engaged with the corner casting holes the corner fittings of the container end are held in abutting disposition against said container guide.

45. A handling cart system for handling a plurality of cargo containers, the cargo containers of the type having two container ends, each container end having two container sides and two corner fittings, each corner fitting having a downwardly facing corner casting hole, the handling cart system comprising:

a plurality of cargo container carts, each cart comprised of
   a frame supported on wheels, said platform having at least two support surfaces and at least one container guide mounted on said frame between said at least two support surfaces each for supporting one of the container ends, each of said at least two support surfaces having two cart pins, said cart pins extending upwardly from said support surface for mating engagement with the corner casting holes of the corner fittings of a container end supported on said support surface for holding the container end on said support surface against said container guide,
   a motor mounted on each said frame for driving said wheels,
   a power source for activating said motor, and
   a braking system for restricting movement of said wheels.

* * * * *